May 21, 1963 S. ROSEN 3,090,453
AUTOMATIC SCALE FILLER APPARATUS
Filed May 2, 1960 2 Sheets-Sheet 1

SIDNEY ROSEN
INVENTOR.

BY Walter G. Finch
ATTORNEY

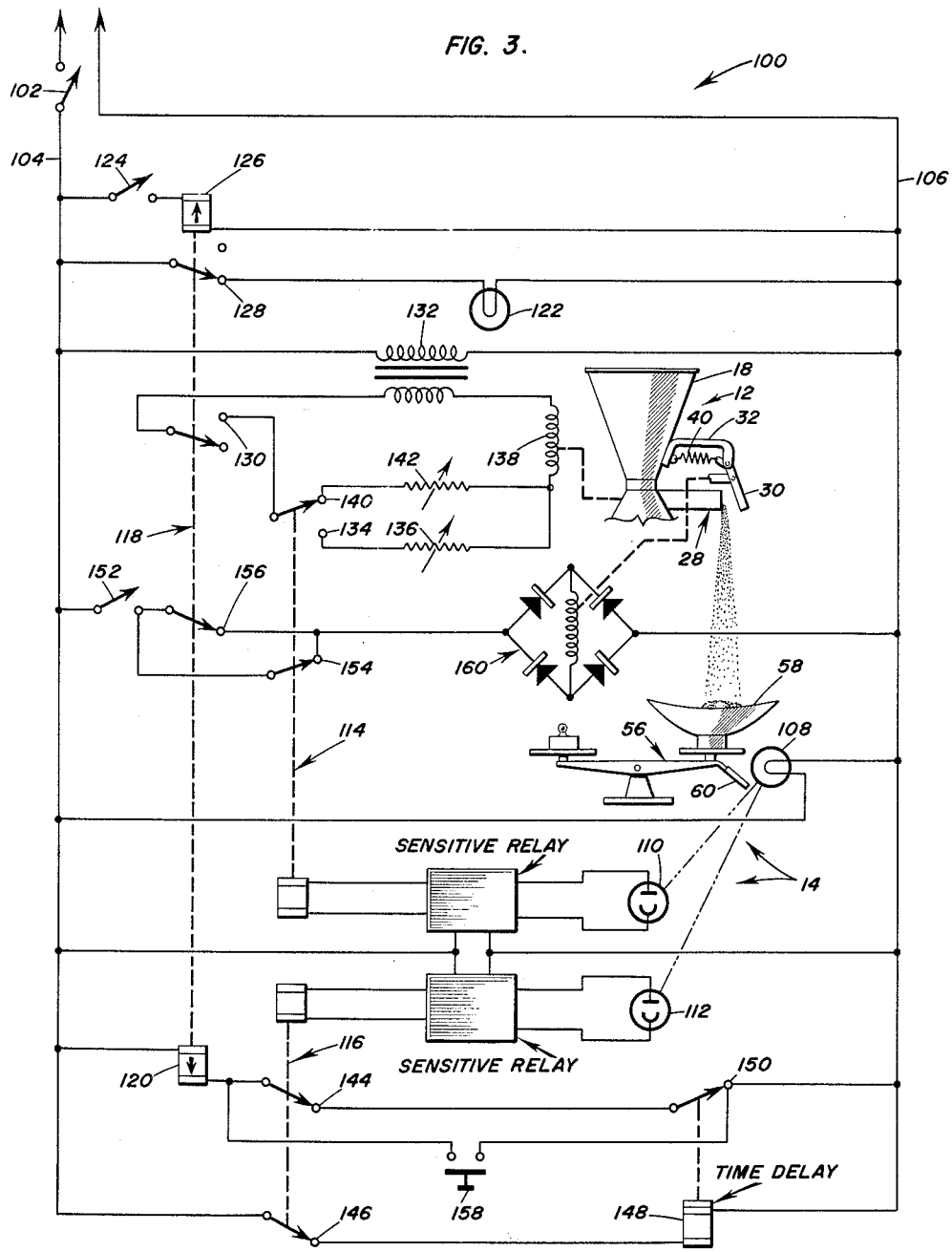

3,090,453
AUTOMATIC SCALE FILLER APPARATUS
Sidney Rosen, 4119 Fordleigh Road, Baltimore, Md.
Filed May 2, 1960, Ser. No. 26,028
2 Claims. (Cl. 177—120)

This invention relates generally to material handling equipment, and more particularly it pertains to an automatic scale filler apparatus for automatically weighing powder, granular materials, tablets, or capsules.

Various devices have been used in the past for signalling the attainment of a predetermined value in the weighing of material. Automatic cutoff of the flow of the material to the scale pan has often been provided using the signal as a control.

The achievement of an accurate end point in an automatic weighing process in the case of powders, granular materials, tablets, or capsules involves delicate dispensing not possible from known prior systems. Overshoot and consequent waste of material is almost certain because the typical agglomeration of the powder, granules, tablets, or capsules is difficult to cut off neatly at the dispensing hopper.

It is, therefore, a primary object of the present invention to provide an accurately controlled automatic weighing apparatus for materials which tend to agglomerate.

Another object of this invention is to provide a tapering off discharge rate chute for feeding lumpy or relatively large particle materials.

Another object of this invention is to provide a stepped cut-off system for an automatic weighing apparatus.

Still another object of this invention is to provide an automatic dispensing hopper having a feed rate proportional to a degree of completion of an associated weighing process.

And yet another object of this invention is to provide a vibratory dispensing chute having an adjustable auxiliary feed aisle and a diversion gate for selective bulk or single feed of plural items.

Other objects and many of the attendant advantages of this invention will be readily appreciated as the same become better understood by reference to the following detailed description when considered in connection with the accompanying drawings in which:

FIG. 3 is a schematic of a control circuit for the novel automatic scale filler apparatus with some parts thereof shown diagrammatically.

Figures 1, 2:
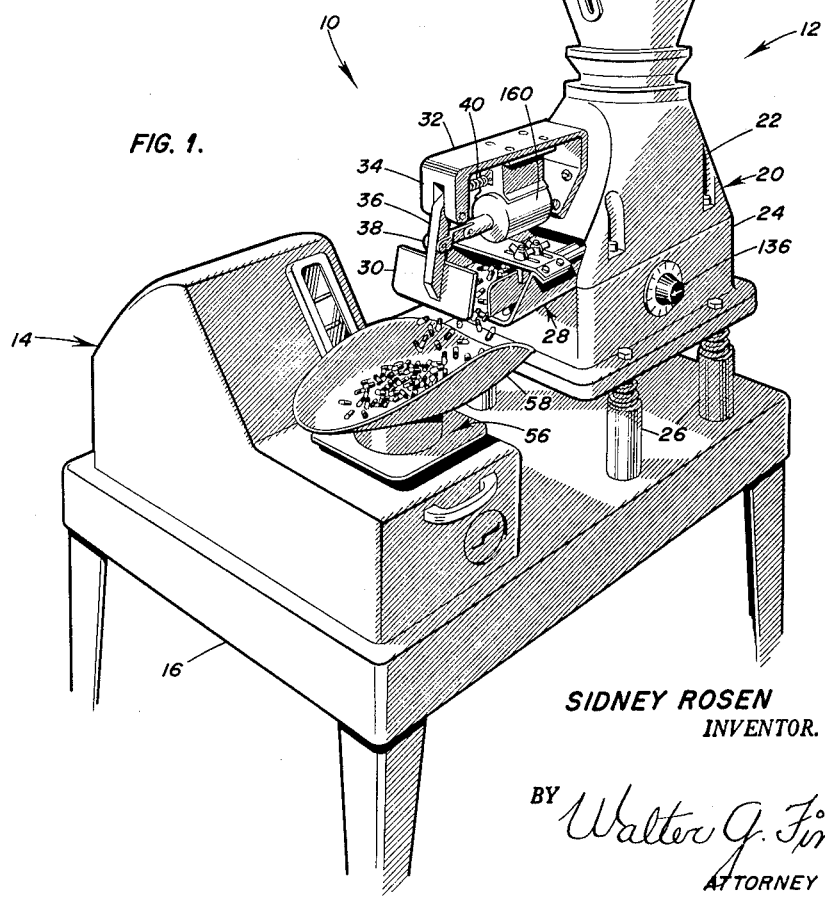
FIG. 1 is a perspective view of an automatic scale filler apparatus incorporating features of this invention and illustrating the weighing of capsules.
FIG. 2 is a perspective view of a discharge chute for the automatic scale filler apparatus showing the adjustable single feed aisle.

Referring now to the details of the drawings, there is illustrated an automatic scale filler apparatus 10 in FIG. 1 which incorporates features of this invention.

This automatic scale filler apparatus 10 consists of a dispensing mechanism 12, and a modified conventional shadow beam balance or scale 14, both of which are secured to a base or table 16. The dispensing mechanism 12 is provided with a hopper 18 which is mounted on a vibrator housing 20 and this assembly as a whole is shock-mounted from the table 16 by means of a plurality of vibration isolating legs 26.

The vibrator housing 20 consists of two halves 22 and 24, which are bolted together. The lower half 24 of the vibrator housing 20 houses a vibrator coil among other electrical components which will be described subsequently, and it has also a fast feed rheostat 136 placed for ready accessibility on the outside. The housing 20 is apertured at the side to receive a discharge chute 28, shown in FIGS. 1 and 2, which is arranged to be vibrated either gently or with vigor.

A bracket 32 extends outwardly from the upper half 22 of the vibrator housing 20 above the chute 28. This bracket 32 terminates in a bifurcated downturned end 34 to which is pivoted a gate hinging bar 36. A gate 30 is secured to the gate hinging bar 36.

A solenoid 160 also depends from the bracket 32. A connecting link 38 joins the plunger of this solenoid 160 to the hinging bar 36, which is spring-held outwardly by a tension coiled spring 40.

The gate 30 is thus held open until the solenoid 160 is energized to overcome the tension of spring 40. Actually, the gate 30 closes off only the left portion or fast feed aisle 46. This fast feed aisle 46 is shown in FIG. 2, and it is formed by a barrier strip or divider 44 which extends nearly the full length of the chute 28 from the open or discharge end.

This divider 44 is adjustable in a lateral direction by means of a pair of wing nuts 54, shown in FIG. 2. A pair of threaded posts 50 for the wing nuts 54 are secured to the upper edge of the divider 44 and extend through slots 52 in a strip or bridge 42 over the chute 28. By this arrangement, a slow feed aisle 48 is formed on the right or ungated side of the chute 28. This slow feed aisle 48 is termed "slow feed" because it can be set in width to deliver a single file sequence of capsules or tablets or a narrow dribble of powdered material.

The scale 14 is located so that a scale pan 58 placed on its balance 56 will receive the material being discharged by gravity from the chute 28. The scale 14 is characterized by employing a focused light beam fiducial marker consisting of a shadow or image of a shutter or eyelid which moves with the balance 56.

The operation of a control circuit 100 for the automatic scale filler apparatus 10 will now be discussed in connection with FIG. 3. A main switch 102 is first closed to apply electric power to a pair of lines 104 and 106. A balance lamp 108 located in the scale 14 then lights, and a pair of spaced photoelectric cells 110 and 112 associated therewith are illuminated to pull in both of their associated relays 114 and 116.

Nothing of consequence happens at this time despite the opening of the contacts 140, 154, 144, and 146 and the closing of contact 134, because a latch relay 118 is held in the position shown, that is, as latched by the lower latch coil 120.

A ready lamp 122 in the control circuit 100 now indicates and the operator depresses a foot switch 124 which is connected to an upper latch coil 126 of the relay 118. The ready lamp 122 goes off as contact 128 opens.

Contacts 130 of latch relay 118 now close. When this occurs, current is routed from a step-down transformer 132 through the previously closed lower contact 134 of photoelectric cell relay 114, through a fast feed rheostat 136, and thence to a vibrator coil 138 for vibrating the discharge chute 28.

Powder is dispensed from the hopper chute 28 into the scale pan 58 on the balance 56. As the scale pan 58 fills, the balance 56 approaches a predetermined level and the light beam from a lamp 108 is effectively obscured to the first photoelectric cell 110 by an eyelid 60 on the balance 56. The relay 114 then drops out, opening the contact 134 and closing a contact 140 to a slow feed rheostat 142, which now governs the vibrator coil 138 at a proportional low intensity.

Powder continues to feed into the scale pan 58, but now at a slow dribble and when the balance reaches the predetermined level, the eyelid 60 darkens the second photoelectric cell 112 whose relay 116 drops back and contact 144 thus closes and energizes latch coil 120.

Contact 146 also energizes a time delay relay 148 which waits a short time and then pulls in its contact 150, reopening the circuit to the latch coil 120 to avoid overheating the same. Latch relay 118 is now back to starting conditions wherein the chute 28 vibration is stopped and powder dispensing ceases. The ready lamp 122 now comes on again, signalling the operator to remove the scale pan 58 with the weighed quantity of powder and indicating that the cycle can be started over again by depressing the foot switch 124.

As has been related, the chute 28 has a spring-held normally-open gate 30 thereon. When the powder is lumpy or large granular materials or tablets which tend to agglomerate are to be dispensed to the scale pan 58, a switch 152 is closed. This introduces circuitry to the D.C. solenoid 160 which closes the gate 30 through the contact 154 at the time the first photo-electric cell 110 is darkened, that is, as the predetermined weight level is approached.

The dribble of material, tablets, etc., still continues, despite the closed gate 30, through the narrow bypass or slow feed aisle 48 which now drops tablets in sequence or single file while the slow feed vibration condition prevails.

A contact 156 on the latch relay 118 maintains the gate 30 closed while the balance 56 is up as the scale pan 58 is being emptied and replaced and before a new cycle is initiated. A push button 158 permits the resetting of the latch relay 118 in the starting position at any time during a cycle, if desired.

Obviously, many modifications and variations of the present invention are possible in light of the above teachings. It is, therefore, to be understood that within the scope of the appended claims the invention may be practiced otherwise than as specifically described.

What is claimed is:

1. An apparatus for automatically dispensing and weighing powder, granular materials, tablets, capsules, or the like, comprising, a dispensing mechanism including a vibratory mounted chute type tray having a bridge portion over the top thereof, a divider element depending from said bridge portion to the chute surface of said chute type tray and extending substantially the length thereof for dividing said tray into fast and slow feed aisles, means to adjustably secure said divider element to and along said bridge portion so as to simultaneously adjust the respective widths of said fast and slow aisles, and a hopper for feeding material to be dispensed into said fast and slow aisles; means including a scale for automatically weighing said material being dispensed by said chute type tray, means for automatically sensing the position of said scale of said weighing means a first time and for shutting off the material being dispensed by said fast feed aisle when a predetermined amount of material has been dispensed and weighed by said weighing means and for simultaneously reducing the intensity of vibration of said chute type tray, and means for automatically sensing the position of said scale of said weighing means a second time when the net weight of material to be dispensed has been reached to halt vibration of said chute type tray and thereby dispensing by said slow aisle.

2. The apparatus as recited in claim 1, wherein said bridge portion has a plurality of longitudinal slots arranged in alignment across the width thereof and said means to adustably secure said divider element to and along said bridge portion includes a plurality of posts secured to said divider element, each post having an upper threaded portion extending through each slot of said plurality of longitudinal slots, and means to threadably engage said threaded portion of each post and tighten it against said bridge portion to thereby fix the position of said divider element along said chute type tray.

References Cited in the file of this patent

UNITED STATES PATENTS

| | | |
|---|---|---|
| 2,067,741 | Weckerly | Jan. 12, 1937 |
| 2,071,443 | Weckerly | Feb. 23, 1937 |
| 2,342,116 | Broekhuysen | Feb. 22, 1944 |
| 2,352,114 | Muskat | June 20, 1944 |
| 2,614,786 | Caron | Oct. 21, 1952 |
| 2,734,735 | Payne | Feb. 14, 1956 |
| 2,904,304 | Zwoyer et al. | Sept. 15, 1959 |

FOREIGN PATENTS

| | | |
|---|---|---|
| 255,586 | Switzerland | Feb. 1, 1949 |